US008290969B2

(12) United States Patent
Williamson

(10) Patent No.: US 8,290,969 B2
(45) Date of Patent: Oct. 16, 2012

(54) SYSTEMS AND METHODS FOR VALIDATING INTERPOLATION RESULTS USING MONTE CARLO SIMULATIONS ON INTERPOLATED DATA INPUTS

(75) Inventor: Eric Williamson, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 48 days.

(21) Appl. No.: 13/037,344

(22) Filed: Feb. 28, 2011

(65) Prior Publication Data
US 2012/0221500 A1    Aug. 30, 2012

(51) Int. Cl.
G06F 7/00       (2006.01)
G06F 15/00      (2006.01)
(52) U.S. Cl. .......................................... 707/756; 706/13
(58) Field of Classification Search .................. 707/756; 706/12, 13, 45, 47; 704/205
See application file for complete search history.

(56) References Cited

U.S. PATENT DOCUMENTS

| | | | |
|---|---|---|---|
| 5,890,167 A | 3/1999 | Bridge, Jr. et al. | |
| 5,978,796 A | 11/1999 | Malloy et al. | |
| 6,360,188 B1 | 3/2002 | Freidman et al. | |
| 6,366,922 B1 | 4/2002 | Althoff | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,704,758 B1 * | 3/2004 | O'Donnell ................... 708/290 |
| 6,711,597 B1 * | 3/2004 | O'Donnell ................... 708/290 |
| 6,735,590 B1 | 5/2004 | Shoup et al. | |
| 6,931,418 B1 | 8/2005 | Barnes | |
| 7,152,062 B1 | 12/2006 | Draper et al. | |
| 7,299,241 B2 | 11/2007 | Reed et al. | |
| 7,660,822 B1 | 2/2010 | Pfleger | |
| 8,073,667 B2 * | 12/2011 | Strang et al. ................... 703/13 |
| 2001/0049678 A1 | 12/2001 | Yaginuma | |
| 2002/0029207 A1 | 3/2002 | Bakalash et al. | |
| 2002/0035562 A1 | 3/2002 | Roller et al. | |
| 2002/0083034 A1 | 6/2002 | Orbanes et al. | |
| 2002/0087516 A1 | 7/2002 | Cras et al. | |
| 2002/0169658 A1 | 11/2002 | Adler | |
| 2003/0114950 A1 | 6/2003 | Ruth et al. | |

(Continued)

OTHER PUBLICATIONS

Using OLAP and Multi-Dimensional data for decision making, Hasan at al. IEEE 2001.

(Continued)

Primary Examiner — Hung T Vy
(74) Attorney, Agent, or Firm — Lowenstein Sandler PC

(57) ABSTRACT

Embodiments relate to systems and methods for validating interpolation results using Monte Carlo simulations on interpolated data inputs. A database can store sets of operational data, such as financial, medical, climate or other information. For given data, a portion of the input data can be known or predetermined, while for a second portion can be unknown and subject to interpolation. The interpolation engine can generate a conformal interpolation function and interpolated input sets that map to a set of target output data. In aspects, in order to test the interpolated input data, the operator can initiate a Monte Carlo or other variational analysis using access a validation dialog. The Monte Carlo process can apply randomized perturbations to the values of the interpolated input variables, and track the results of that perturbation on the other interpolated inputs. A set of validation rules can be applied to those randomized results, to determine whether the remaining interpolated variables remain in conformance with expected ranges or values or demonstrate anomalous responses.

22 Claims, 6 Drawing Sheets

U.S. PATENT DOCUMENTS

| | | |
|---|---|---|
| 2003/0115194 A1 | 6/2003 | Pitts et al. |
| 2003/0115207 A1 | 6/2003 | Bowman et al. |
| 2003/0120372 A1 | 6/2003 | Ruth et al. |
| 2003/0126114 A1 | 7/2003 | Tedesco |
| 2003/0184585 A1 | 10/2003 | Lin et al. |
| 2003/0225736 A1 | 12/2003 | Bakalash et al. |
| 2004/0133552 A1 | 1/2004 | Greenfield et al. |
| 2004/0039736 A1 | 2/2004 | Kilmer et al. |
| 2004/0139061 A1 | 7/2004 | Colossi et al. |
| 2005/0004904 A1 | 1/2005 | Keamey et al. |
| 2005/0010566 A1 | 1/2005 | Cushing et al. |
| 2005/0060382 A1 | 3/2005 | Spector et al. |
| 2006/0004833 A1 | 1/2006 | Trivedi et al. |
| 2006/0036707 A1 | 2/2006 | Singh et al. |
| 2006/0136462 A1 | 6/2006 | Campos et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0208721 A1 | 9/2007 | Zaman et al. |
| 2008/0140696 A1 | 6/2008 | Mathuria |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0193039 A1 | 7/2009 | Bradley et al. |
| 2009/0222470 A1 | 9/2009 | Kemp et al. |
| 2010/0057700 A1 | 3/2010 | Williamson |
| 2010/0057777 A1 | 3/2010 | Williamson |
| 2010/0131456 A1 | 5/2010 | Williamson |
| 2010/0149917 A1* | 6/2010 | Imhof et al. ............... 367/53 |
| 2010/0169299 A1 | 7/2010 | Pollara |
| 2010/0174532 A1* | 7/2010 | Vos et al. ............... 704/205 |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2010/0326669 A1* | 12/2010 | Zhu et al. ............... 166/369 |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

A new OLAP aggregation based on the AHC technique, Massaoud et al, DOLAP'04 Nov. 12-13, 2004.

Interactive hierarchical dimension ordering, spacing and filtering for exploration of high dimension datasets, Yang at al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-Weighted Variables", U.S. Appl. No. 12/951,881, filed Nov. 22, 2010.

Williamson, "Systems and Methods for Tracking Differential, Changes in Conformal Data : Input Sets", U.S. Appl. No. 12/951,937, filed Nov. 22. 2010.

Williamson, "Systems and Methods for Training a Self-Learning Network Using Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

Williamson, "Systems and Methods for Generating Portable Interpolated Data Using Object Based Encodig of Interpolated Results", U.S. Appl. No. 13/037,322, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

ASPFAQ.com, "What are the valid styles for converting datetime to string?", (2006) http://database.aspfaq.com/database/what-are-the-valid-styles-for-converting-datetime-to-string.html.

Answering Joint Queries from Multiple Aggregate OLAP Databases, Pourabbas et al, LNCS 2737, pp. 24-34, 2003.

* cited by examiner

SYSTEMS AND METHODS FOR VALIDATING INTERPOLATION RESULTS USING MONTE CARLO SIMULATIONS ON INTERPOLATED DATA INPUTS

FIELD

The invention relates generally to systems and methods for validating interpolation results using Monte Carlo simulations on interpolated data inputs, and more particularly, to platforms and techniques for accessing sets of previously-generated interpolated input data, and validating or verifying the soundness of that data by subjecting co-variables in the data to randomized Monte Carlo perturbations, and determining whether the remaining variables in the data set demonstrate stable or well-behaved responses to those changes.

BACKGROUND

In the fields of computational modeling and high performance computing, modeling platforms are known which contain a modeling engine to receive a variety of modeling inputs, and then generate a precise modeled output based on those inputs. In conventional modeling platforms, the set of inputs are precisely known, and the function applied to the modeling inputs is precisely known, but the ultimate results produced by the modeling engine are not known until the input data is supplied and the modeling engine is run. For example, in an econometric modeling platform, inputs for a particular industry like housing can be fed into a modeling engine. Those inputs can include, for instance, prevailing finance rates, employment rates, average new-home costs, costs of building materials, rate of inflation, and other economic or other variables that can be fed into the modeling engine which is programmed or configured to accept those inputs, apply a function or other processing to those inputs, and generate an output such as projected new-home sales for a given period of time. Those results can then be used to analyze or forecast other details related to the subject industry, such as predicted sector profits or employment.

In many real-life analytic applications, however, the necessary inputs for a given subject or study may not be known, while, at the same time, a desired or target output may be known or estimated with some accuracy. For instance, the research and development (R&D) department of a given corporation may be fixed at the beginning of a year or other budget cycle, but the assignment or allocation of that available amount of funds to different research teams or product areas may not be specified by managers or others. In such a case, an analyst may have to manually estimate and "back out" distributions of budget funds to different departments to begin to work out a set of component funding amounts that will, when combined, produce the already-known overall R&D or other budget. In performing that interpolation, the analyst may or may not be in possession of some departmental component budgets which have themselves also been fixed, or may or may not be in possession of the computation function which will appropriately sum or combine all component funds to produce the overall predetermined target budget. Adjustment of one component amount by hand may cause or suggest changes in other components in a ripple effect, which the analyst will then have to examine or account for in a further iteration of the same manual estimates.

In cases where an interpolation study is conducted, the ultimate selection of interpolated inputs and other data used to perform interpolation may itself contain implied information regarding the appropriate breakdowns of the data, judgments about which inputs should receive priority compared to others, and other attributes of the eventual input breakouts and the interpolation function developed for that data. In cases, the values for the interpolated inputs may be introduced by an analyst or other user acting to adjust those interpolated values, to determine alternative solutions.

In cases, it may be helpful or necessary for the operator of an interpolation tool to explore the validity of data that has been produced in one or more previous interpolation studies. The user may wish to test or validate the results of previous studies for various reasons, including, for instance, because one or more variables produced in prior results may have been determined to be inaccurate or unreliable in other studies or applications. In cases, a user may wish to validate a set of interpolated inputs before using those inputs in other applications or studies, or may simply wish to check the interpolation results for general verification. No existing tools or platforms exist to accept previously-generated interpolation results, and subject those results to Monte Carlo and/or other randomized or perturbation-based analysis. It may be desirable to provide systems and methods for validating interpolation results using Monte Carlo simulations on interpolated data inputs, in which an operator can supply or identify an existing set or sets of interpolation data, configure a Monte Carlo or other analysis to be performed on that data, and examine the results of that perturbation process to validate or invalidate variables within the existing data sets based on those outcomes.

DESCRIPTION

Figure 1:
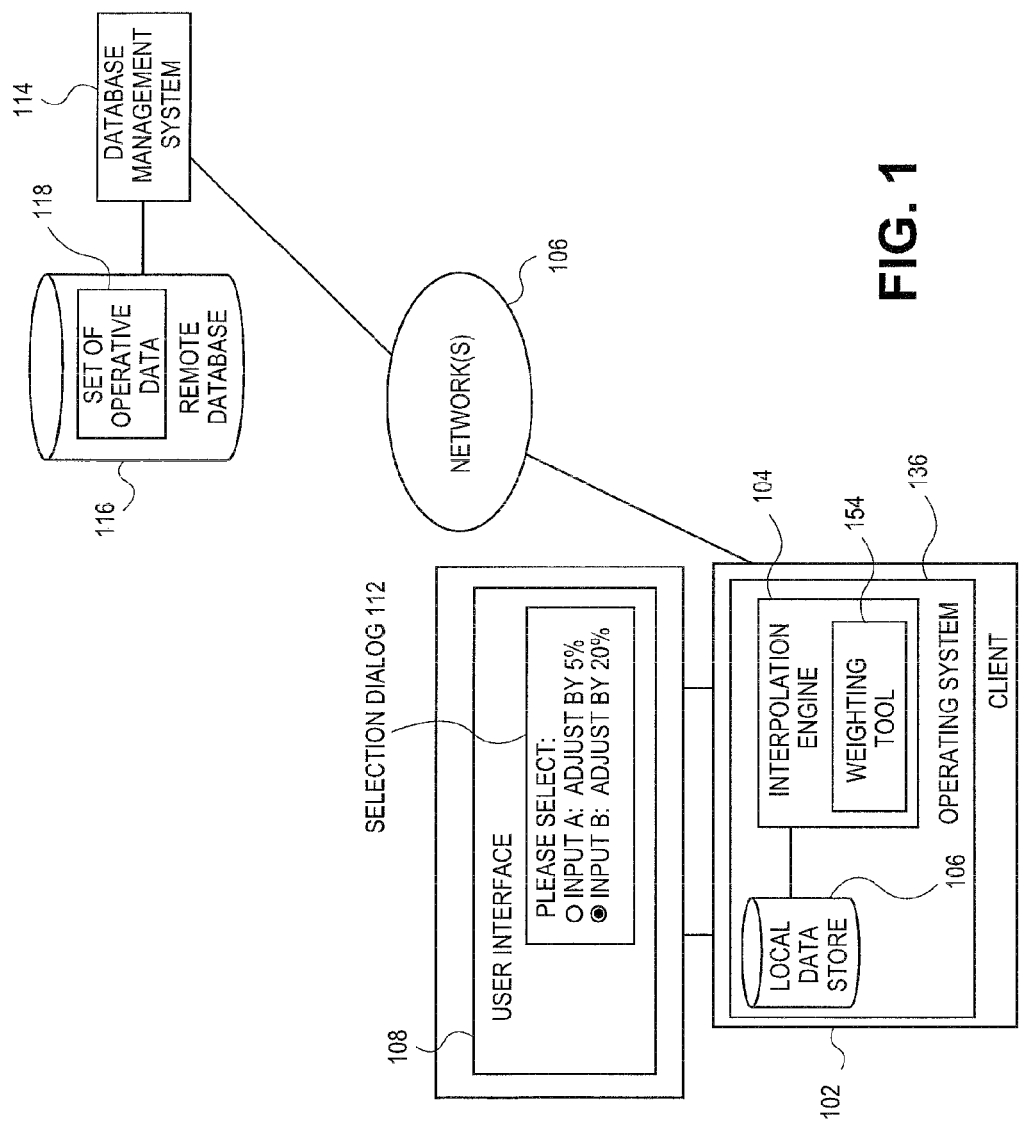
FIG. 1 illustrates an overall network architecture which can support the generation of interpolated input sets based on a target output, according to various embodiments of the present teachings.

Embodiments relate to systems and methods for validating interpolation results using Monte Carlo simulations on interpolated data inputs. More particularly, embodiments relate to an interpolation platform and related techniques which can be configured to perform Monte Carlo analysis or process on one or more selected variables or parameters contained in a set of interpolated input data, and determine or estimate the validity of the remainder of those values based on the response to the Monte Carlo randomization of the selected inputs. In terms of the interpolated data which the Monte Carlo or other module, tool, or logic can access and operate on, that underlying data can be generated by one or more underlying interpolation platforms which access or retrieve a set of historical, operational, archival, or other operative data related to captured technical, financial, medical, or other operations, and supply that operative data to an interpolation engine. The interpolation engine can also be supplied with or can access a set of target output data, for purposes of generating a set of estimated, approximated, inferred, or otherwise interpolated inputs that can be supplied to the interpolation engine to produce the target output. Thus, for instance, in an illustrative context of a climate modeling platform, a collection or set of historical input data, such as ocean temperatures, air temperatures, land temperatures, average wind speed and direction, average cloud cover, and/or other inputs or factors can be accessed or retrieved from a data store. The data store can for the interpolation platform can for instance include records of those or other variables for each year of the last ten years, along with an output or result associated with those inputs, such as ocean level or polar cap area for each of those years or other series. In aspects, a partial set or subset of predetermined or fixed values for the same inputs can be supplied to the interpolation engine, such as predicted or assumed arctic temperatures, for the current year. The interpolation engine can also receive a set of target output data, such as the expected or projected ocean level or polar cap area for the current year. According to embodiments, the interpolation engine can then generate an interpolation function, and generate a set of interpolated inputs, such as air temperature, land temperature, average wind speed and direction, average cloud cover, and/or other remaining inputs whose values are unspecified, but which can be interpolated to produce values which when supplied as input to the interpolation engine can produce the set of target output data.

In cases, an analyst, operator, and/or other user may wish to generate and explore variations, modifications, and/or alternatives to the historical input data and/or the interpolated portions of that data, or possibly of the output data. In such scenarios, a user can invoke a weighting tool hosted in the interpolation engine, in order to a weighting dialog to input user-selected or specified weights to apply to one or more of the set of predetermined data, and/or interpolated input data or other data. The user can pursue different scenarios using different sets of weights that they have entered, to compare different outcomes or series of input and output data. In an economic study investigating the effects of interest rates on housing sales, for example, a user may assign a weight of 1.1 (i.e., increase the value or significance by 10%) to the prevailing interest rate for a certain category of housing over the first quarter of 2009, while inputting or assigning a weight of 0.9 (i.e., decrease the value or significance) to the amount of housing stock available in the same quarter. The user can then view the results of that adjustment on the predetermined output data to examine whether that output remains at its initial or desired value, and/or to see the effects on the set of interpolated input data, such as for instance average time on market for a housing unit, due to that altered scenario. Other variations or combinations of data weightings of course are possible.

In cases, the interpolation engine, weighting tool, and/or other logic can generate different combinations of the set of interpolated input data in different generations, series, and/or other alternative values or groupings, to permit an analyst or other user to manipulate the input values, to observe different ramifications of different weights that may be applied to parts of, and/or time periods for, the set of interpolated inputs and/or other components of the data. The user of the weighting tool can be presented with a weighting dialog or other interface to manipulate the weights, scales, and/or other modifiers to be applied to the set of interpolated input values, and select or adjust those values (and/or the interpolation function used to generate those values). The analyst or other user can thereby determine scenarios, sets of weights to be applied to the known inputs or other types of data, and examine the effects on the output data, to determine for instance whether the known output data can be maintained or maintained within desired ranges under different weighting conditions. The ability to analyze and derive input sets under different weights, time periods for those weights, and/or other selective adjustments may permit an operator to explore or derive new series of input data that may produce already-known or desired outputs, and/or other outputs if those inputs are varied by relative importance or weight. In aspects, the interpolation function that may accept the weighted input values and still maintain or output the set of known or fixed output data can also be identified or generated.

After completion of those or other types of interpolation studies or reports, according to the present teachings, the sets of weights, the sets of time periods for those weights, the set of resulting interpolated input values and other data can be stored to a local or remote data store. According to embodiments of the present teachings, that data can then be accessed or retrieved by the same interpolation platform and/or weighting tool, and/or other tools or users, for instance to perform further interpolation or modeling activity consistent with the weighted and/or interpolated values and target output data.

In embodiments, and also after completion of those or other types of interpolation studies or reports, according to the present teachings, a user can invoke a Monte Carlo engine hosted in a client to perform a randomized perturbation process or routine on the interpolated inputs produced by those previous studies or reports, and determine the response behavior of the remaining interpolated input values to see if those values remain comparatively well-behaved or consistent, and therefore appear likely to be or represent valid values or ranges for the data concerned.

Consistent with the foregoing, in embodiments as shown in FIG. 1, in accordance with embodiments of the invention, a user can operate a client 102 which is configured to host an interpolation engine 104, to perform interpolation and other analytic operations as described herein. In aspects, while embodiments are described in which interpolation engine 104 is described to operate on historical data to interpolate or fill in missing values or parameters, in embodiments, it will be understood that interpolation engine 104 can in addition or instead operate to produce extrapolated data, reflecting expected future values of inputs and/or outputs. In aspects, the client 109 can be or include a personal computer such as a desktop or laptop computer, a network-enabled cellular telephone, a network-enabled media player, a personal digital assistant, and/or other machine, platform, computer, and/or device. In aspects, the client 102 can be or include a virtual machine, such as an instance of a virtual computer hosted in a cloud computing environment. In embodiments as shown, the client 102 can host or operate an operating system 136, and can host or access a local data store 106, such as a local hard disk, optical or solid state disk, and/or other storage. The client 102 can generate and present a user interface 108 to an analyst or other user of the client 102, which can be a graphical user interface hosted or presented by the operating system 136. In aspects, the interpolation engine 104 can generate a selection dialog 112 to the user via the user interface 108, to present the user with information and selections related to interpolation and other analytic operations.

In embodiments as likewise shown, the client 102 and/or interpolation engine 104 can communicate with a remote database management system 114 via one or more networks 106. The one or more networks 106 can be or include the Internet, and/or other public or private networks. The database management system 114 can host, access, and/or be associated with a remote database 116 which hosts a set of operative data 118. In aspects, the database management system 114 and/or remote database 118 can be or include remote database platforms such the commercially available Oracle™ database, an SQL (structured query language) database, an XML (extensible markup language) database, and/or other storage and data management platforms or services. In embodiments, the connection between client 102 and/or the interpolation engine 104 and the database management system 114 and associated remote database 116 can be a secure connection, such as an SSL (secure socket layer) connection, and/or other connection or channel. The interpolation engine 104 can access the set of operative data 118 via the database management system 114 and/or the remote database 116 to operate, analyze, interpolate and map the set of operative data 118 and other data sets to produce or conform to a set of target output data 120. In aspects, the predetermined or already-known set of target output data 120 can be stored in set of operative data 118, can be received as input from the user via selection dialog 112, and/or can be accessed or retrieved from other sources.

Figure 2A:
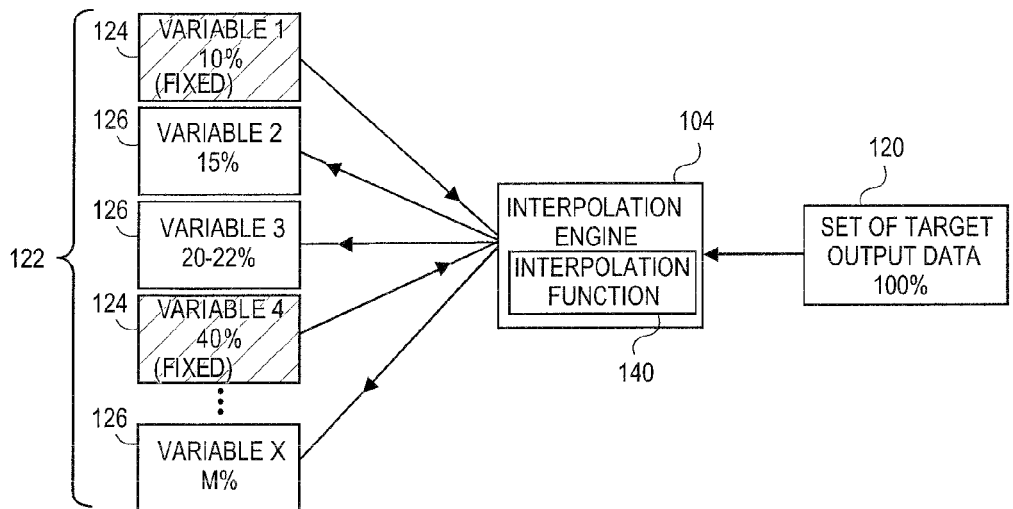
FIGS. 2A-2B illustrate various exemplary sets of input data, and series of sets of input data, that can be produced by interpolation techniques whose output and other data can be used in systems and methods for validating interpolation results using Monte Carlo simulations on interpolated data inputs, according to various embodiments.
Figure 2B:
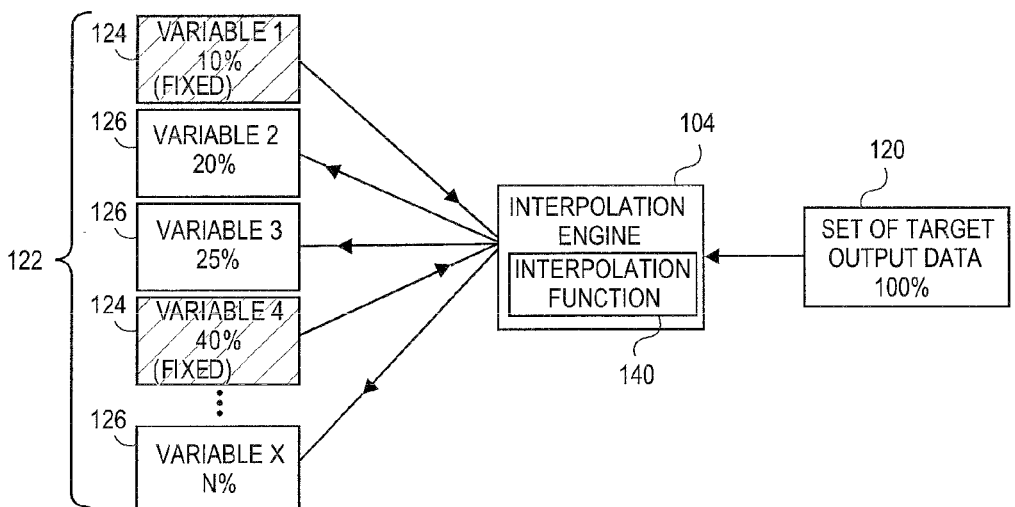

In embodiments, and as shown in FIGS. 2A-2B, the interpolation engine 104 can, in general, receive the set of target output data 120, and operate on that data to produce a conformal mapping of a set of combined input data 122 to generate an output of the desired set of target output data. As for instance shown in FIG. 2A, the set of combined input data 122 can, in cases, comprise at least two component input data sets or subsets. In aspects as shown, the set of combined input data 122 can comprise or contain a set of predetermined input data 124. The set of predetermined input data 124 can consist of data that is predetermined or already known or captured, for instance by accessing the set of operative data 118, and/or by receiving that data from the user as input via the selection dialog 112. In aspects, the set of predetermined input data 124 can include variables or other data which are already known to the user, to other parties, or has already been fixed or captured. In the case of a medical epidemiology study, for example, the set of predetermined input data 124 can include the number of vaccination doses available to treat an influenza or other infectious agent. For further example, in cases where the set of combined input data 122 represents the components of a corporate or government financial budget, the set of predetermined input data 124 can reflect the percentages (as for instance shown), for example to be allocated to different departments or agencies. It will be appreciated that other percentages, contributions, expressions, and/or scenarios or applications can be used.

In aspects, the interpolation engine 104 can access and process the set of predetermined input data 124 and the set of target output data 120, to generate a set of interpolated input data 126 which can produce the set of target output data 120 via an interpolation function 140. For instance, if the set of target output data 120 represents a total budget amount for an entity, then the set of interpolated input data 126 can reflect possible, approximate, or suggested values or percentages of that total funded amount that the interpolation engine 104 can allocate to various departments, using the interpolation function 140. Again, as noted the interpolation function 140 can be determined by interpolation engine 104 to generate the set of target output data 120, as predetermined by the user or otherwise known or fixed. In embodiments, interpolation techniques, functions, and/or other related processing as described in co-pending U.S. application Ser. No. 12/872,779, entitled "Systems and Methods for Interpolating Conformal Input Sets Based on a Target Output," filed on Aug. 31, 2010, having the same inventor as this application, assigned or under obligation of assignment to the same entity as this application, and incorporated by reference in its entirety herein, can be used in determining interpolation function 140, configuring and/or executing interpolation engine 104, and/or performing other related operations. In aspects, the interpolation engine 104 can also comprise, host, and/or access a weighting tool 154, which may be used to open or initiate a weighting dialog and receive user inputs, selections, and/or other manipulations to the set of predetermined input data 124 and/or other data components, to generate different or alternative data series for comparative examination or other purposes, as described herein.

The following applications, scenarios, applications, or illustrative studies will illustrate the interpolation action or activity that may be performed by the interpolation engine 104, according to various embodiments. In cases, again merely for illustration of exemplary interpolation analytics, the set of operative data 118 can be or include data related to medical studies or information. Thus for instance, the set of operative data 118 can include data for a set or group of years that relate to public health issues or events, such as the population-based course of the influenza seasons over that interval. The set of operative data can include variables or inputs that were captured or tracked for the influenza infection rate in the population for each year over the given window. Those variables or inputs can be or include, for instance, the percentage of the population receiving a public vaccine by Week 10 of the flu season, e.g. 20%, the age cohorts of the patients receiving the vaccine, the strain of the influenza virus upon which the vaccine is based, e.g. H5N5, the infectivity or transmission rate for a given infected individual, e.g. 3%, the average length of infectious illness for the infected population, e.g. 10 days, and/or other variables, metrics, data or inputs related to the epidemiology of the study. In aspects, the output or result of those tracked variables can be the overall infection rate for the total population at peak or at a given week or other time point, such as 40%. Other outputs or results can be selected. Those inputs and output(s) can be recorded in the set of operative data 118 for a set or group of years, such as for each year of 2000-2009, or other periods. In aspects, data so constituted can be accessed and analyzed, to generate interpolated data for current year 2010, although the comparable current inputs are not known or yet collected. In the current year (assumed to be 2010), one or more of the set of predetermined variables 124 may be known, such as, for instance, the vaccination rate of because yearly stocks are known or can be reliably projected, e.g. at 25%. In addition, an analyst or other user may specify a set of target output data 120 that can include the overall infection rate for the population the year under study, such as 35% at peak. In cases of this illustrative type, the interpolation engine 104 can access or receive the overall infection rate (35% peak) as the set of predetermined output data 120 or a part of that data, as well as the vaccination rate (25%) as the set of predetermined input data 124 or part of that data. In aspects, the interpolation engine 104 can access the collected historical data (for years 2000-2009) to analyze that data, and generate an interpolation function 140 which operates on the recorded inputs to produce the historical outputs (overall infection rate), for those prior years, either to exact precision, approximate precision, and/or to within specified margins or tolerance. The interpolation engine 104 can then access or receive the set of target output data 120 for the current (2010) year (35% peak infection), the set of predetermined input data (25% vaccination rate), and/or other variables or data, and utilize the interpolation function 140 to generate the set of interpolated input data 126. In the described scenario, the set of interpolated input data 126 generated or produced by the interpolation engine 104 can include the remaining unknown, speculative, uncollected, or otherwise unspecified inputs, such as the percentage of the population receiving a public vaccine by Week 10 of the flu season, e.g. 25%, the age cohorts of the patients receiving the vaccine, the strain of the influenza virus upon which the vaccine is based, e.g. H1N5, the infectivity or transmission rate for a given infected individual, e.g. 4%, the average length of infectious illness for the infected population, e.g. 9 days, and/or other variables, metrics, data or inputs. In aspects, the interpolation engine 104 can generate or decompose the set of interpolated input data 126 to produce the set of target output data 120 (here 35% peak infection) to exact or arbitrary precision, and/or to within a specified margin or tolerate, such as 1%. Other inputs, outputs, applications, data, ratios and functions can be used or analyzed using the systems and techniques of the present teachings.

In embodiments, as noted the interpolation function 140 can be generated by the interpolation engine 104 by examining the same or similar variables present in the set of operative data 118, for instance, medical data as described, or the total fiscal data for a government agency or corporation for a prior year or years. In such cases, the interpolation engine 104 can generate the interpolation function 140 by assigning the same or similar categories of variables a similar value as the average of prior years or sets of values for those same variables, and then perform an analytic process of those inputs to derive set of target output data 120 as currently presented. The interpolation engine 104 can, for example, apply a random perturbation analysis to the same variables from prior years, to produce deviations in amount for each input whose value is unknown and desired to be interpolated. When combinations of the set of predetermined input data 124 and set of interpolated input data 126 are found which produce the set of target output data 120, or an output within a selected margin of set of target output data 120, the user can operate the selection dialog 112 or otherwise respond to accept or fix those recommended or generated values.

In cases, and as for instance illustrated in FIG. 2B, the set of combined input data 122 can be generated to produce the set of target output data 120 may not be unique, as different combinations of the set of predetermined input data 124 and set of interpolated input data 126 can be discovered to produce the set of target output data 120 either exactly, or to within specified tolerance. In such cases, different versions, generations, and/or series of set of combined input data 122 can be generated that will produce the set of target output data 120 to equal or approximately equal tolerance. For example, in cases where the set of operative data 118 relates to an epidemiological study, it may be found that a limit of 20 million cases of new infection during a flu season can be produced as the set of target output data 120 by applying 40 million doses of vaccine at week 6 of the influenza season, or can be produced as a limit by applying 70 million doses of vaccine at week 12 of the same influenza season. Other variables, operative data, ratios, balances, interpolated inputs, and outputs can be used or discovered. In embodiments as noted, when the possible conformal set of interpolated inputs 126 is not unique, the interpolation engine 104 can generate a set of interpolated input series, each series containing a set of interpolated input data 126 which is different and contains potentially different interpolated inputs from other conformal data sets in the set of interpolated input series. In cases where such alternatives exist, the interpolation engine 104 can generate and present the set of interpolated input series, for instance, in series-by-series graphical representations or otherwise, to select, compare, and/or manipulate the results and values of those respective data sets. In embodiments, the analyst or other user may be given a selection or opportunity to choose one set of interpolated input data 126 out of the set of interpolated input series for use in their intended application, or can, in embodiments, be presented with options to continue to analyze and interpolate the set of operative data 118, for example to generate new series in the set of interpolated input series. Other processing options, stages, and outcome selections are possible.

Figure 3:
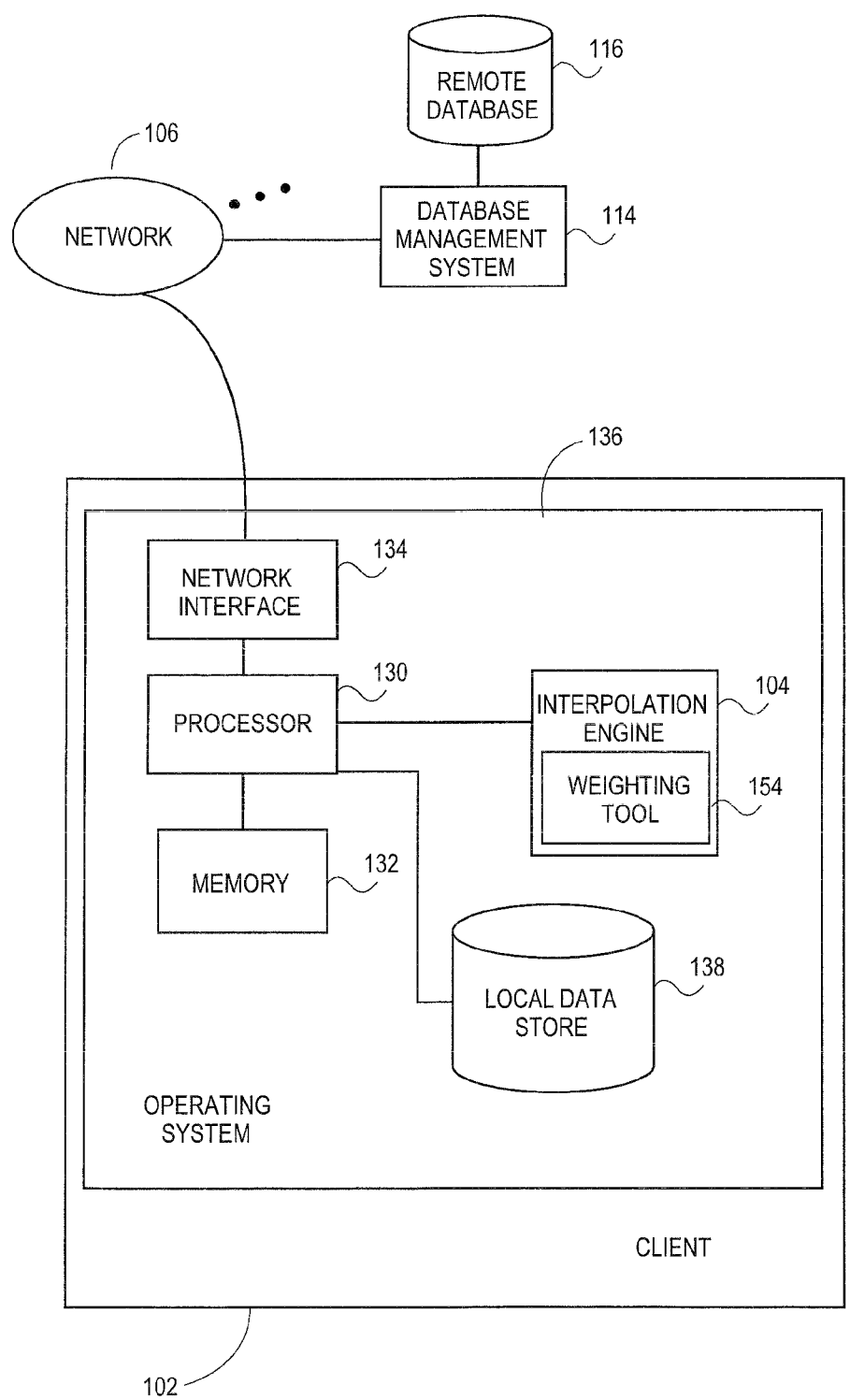
FIG. 3 illustrates an exemplary hardware configuration for client machine which can host or access interpolation processes whose output and related data can be used in systems and methods for validating interpolation results using Monte Carlo simulations on interpolated data inputs, according to various embodiments.

FIG. 3 illustrates an exemplary diagram of hardware and other resources that can be incorporated in a client 102 that can host interpolation engine 104, and/or other logic or resources, and/or otherwise be used in connection with systems and methods for validating interpolation results using Monte Carlo simulations on interpolated data inputs, according to embodiments. In aspects, the client 102 can be or include a personal computer, a network enabled cellular telephone, or other networked computer, machine, or device. In embodiments as shown, the client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 can also communicate with the interpolation engine 104 and/or a local data store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with database management system 114 and/or remote database 116, such as an Oracle™ or other database system or platform, to access set of operative data 118 and/or other data stores or information. Other configurations of client 102, associated network connections, storage, and other hardware and software resources are possible. In aspects, the database management system 114, Monte Carlo engine 164, and/or other servers, engines hardware and/or other platforms can be or include a computer system comprising the same or similar components as the client 102, or can comprise different hardware and software resources.

Figure 4:
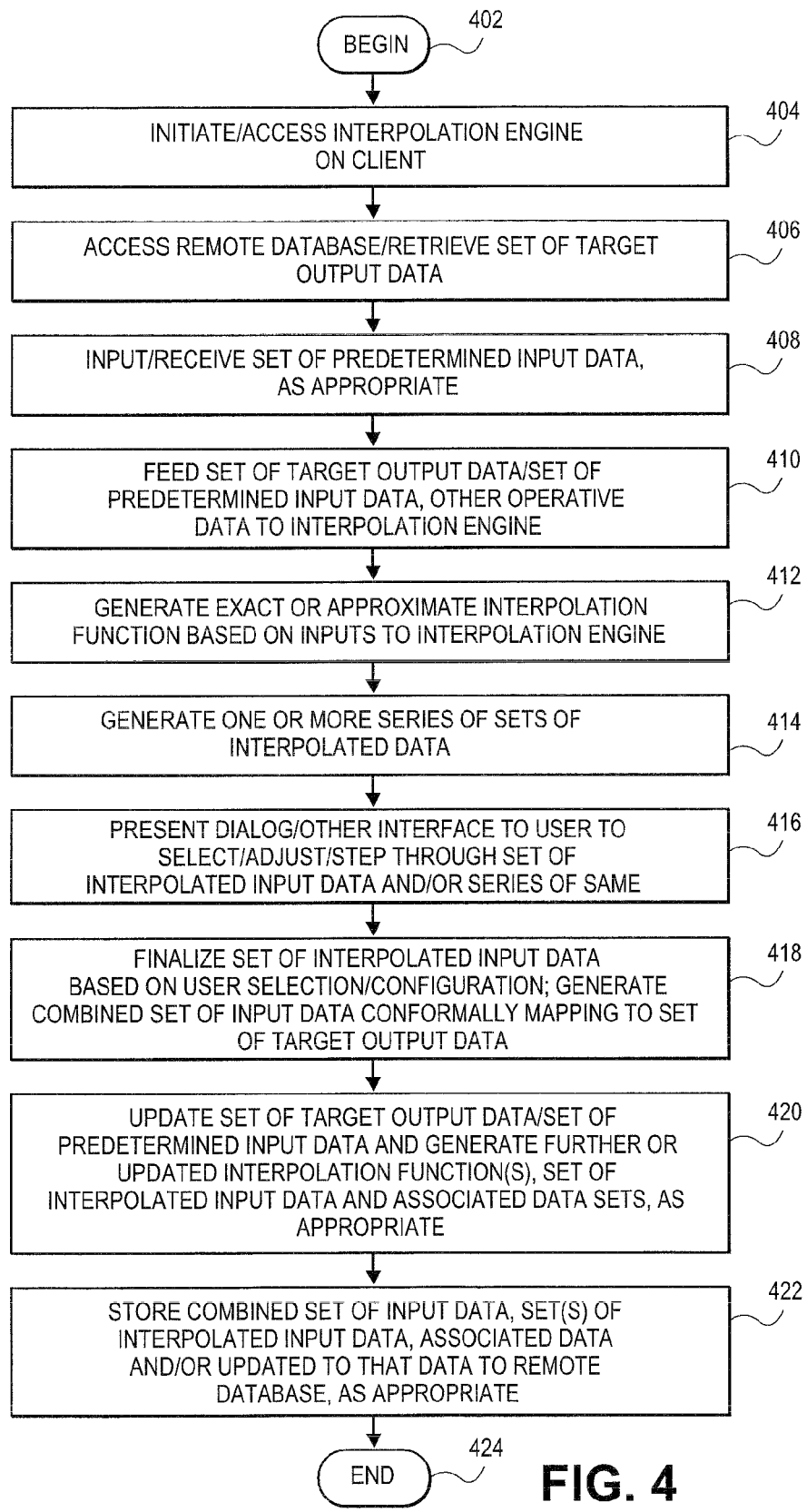
FIG. 4 illustrates a flowchart for overall interpolation, function determination, and other processing that can be used to produce conformal input sets based on a target output that can be used in systems and methods for validating interpolation results using Monte Carlo simulations on interpolated data inputs, according to various embodiments.

FIG. 4 illustrates a flowchart of overall processing to generate interpolation functions, sets of interpolated data, and other reports or information, according to various embodiments of the present teachings. In 402, processing can begin. In 404, a user can initiate and/or access the interpolation engine 104 on client 102, and/or through other devices, hardware, or services. In 406, the user can access the remote database 116 via the database management system 114 and retrieve the set of target output data 120 and/or other associated data or information. In 408, the interpolation engine 104 can input or receive the set of predetermined input data 124, as appropriate. In embodiments, the set of predetermined input data 124 can be received via a selection dialog 112 from the user or operator of client 102. In embodiments, the set of predetermined input data 124 can in addition or instead be retrieved from the set of operative data 116 stored in remote database 116, and/or other local or remote storage or sources. In aspects, the set of predetermined input data 124 can be or include data that is already known or predetermined, which has a precise target value, or whose value is otherwise fixed. For instance, in cases where the set of operative data 118 relates to an undersea oil reserve in a hydrology study, the total volume of oil stored in a reservoir can be known or fixed, and supplied as part of the set of predetermined input data 124 by the user or by retrieval from a local or remote database. In 410, the set of target output data 120, the set of predetermined input data 124, and/or other data in set of operative data 118 or other associated data can be fed to interpolation engine 104.

In 412, the interpolation engine 104 can generate the interpolation function 140 as an exact or approximate function that will generate output conforming to the set of target output data 120, as an output. In aspects, the interpolation function 140 can be generated using techniques such as, for instance, perturbation analysis, curve fitting analysis, other statistical analysis, linear programming, and/or other analytic techniques. In aspects, the interpolation function 140 can be generated to produce an approximation to the set of target output data 120, or can be generated to generate an approximation to set of target output data 120 to within an arbitrary or specified tolerance. The interpolation function 140 can also, in aspects, be generated to produce set of target output data 120 with the highest degree of available accuracy. In 414, the interpolation engine 104 can generate one or more subsets of interpolated input data 126, and/or one or more set of interpolated input series 128 containing individual different combinations of subsets of interpolated input data 126. In aspects, the set of interpolated input data 126 and/or the set of interpolated input series 128 can be generated by applying the set of target output data 120 to the set of predetermined input data 124 and filling in values in the set of interpolated input data 126 which produce an output which conforms to the set of target output data 120, exactly or to within a specified tolerance range. In aspects, the set of interpolated input data 126 and/or the set of interpolated input series 128 can be generated by producing sets of possible interpolated inputs which are then presented to the user via the selection dialog 112, for instance to permit the user to accept, decline, or modify the values of set of interpolated input data 126 and/or the set of interpolated input series 128.

In 416, the interpolation engine 104 can present the selection dialog 112 to the user to select, adjust, step through, and/or otherwise manipulate the set of interpolated input data 126 and/or the set of interpolated input series 128, for instance to allow the user to view the effects or changing different interpolated input values in those data sets. For example, in a case where the set of operative data 118 relates to financial budgets for a corporation, the user may be permitted to manipulate the selection dialog 112 to reduce the funded budget amount for one department, resulting in or allowing an increase in the budget amounts for a second department or to permit greater investment in IT (information technology) upgrades in a third department. In aspects, the selection dialog 112 can permit the adjustment of the set of interpolated input data 126 and/or set of interpolated input series 128 through different interface mechanisms, such as slider tools to slide the value of different interpolated inputs through desired ranges. In 418, the user can finalize the set of interpolated input data 126, and the interpolation engine 104 can generate the resulting combined set of input data 122 which conformally maps to the set of target output data 120. In 420, the set of target output data 120, set of predetermined input data 124, and/or other information related to the set of operational data 116 and the analytic systems or phenomena being analyzed can be updated. The interpolation engine 104 and/or other logic can generate a further or updated interpolation function 140, a further or updated set of interpolated input data 126, and/or an update to other associated data sets in response to any such update to the set of target output data 120 and/or set of predetermined input data 124, as appropriate. In 422, the combined set of input data 122, the set of interpolated input data 126, the set of interpolated input series 128, the interpolation function 140, and/or associated data or information can be stored to the set of operative data 118 in the remote database 116, and/or to other local or remote storage. In 424, as understood by persons skilled in the art, processing can repeat, return to a prior processing point, jump to a further processing point, or end.

According to embodiments of the present teachings, the set of combined input data 122 including the set of predetermined input data 124, the set of interpolated input data 126, as well as the set of target output data 120 and/or other information generated by the interpolation engine 104 and/or other logic can be subjected to a variational analysis to test, validate, and/or otherwise process that set of information to verify or confirm the soundness or robustness of that information under random or other deviations in interpolated inputs. That is, in aspects, an operator wishing to probe or validate the set of interpolated input data 126 and/or other interpolation results can subject the variables of that interpolated data to a Monte Carlo or other variational analysis, to confirm that expected values or other characteristics of the remaining interpolated inputs or other data remain within conforming or anticipated ranges.

Figure 5:
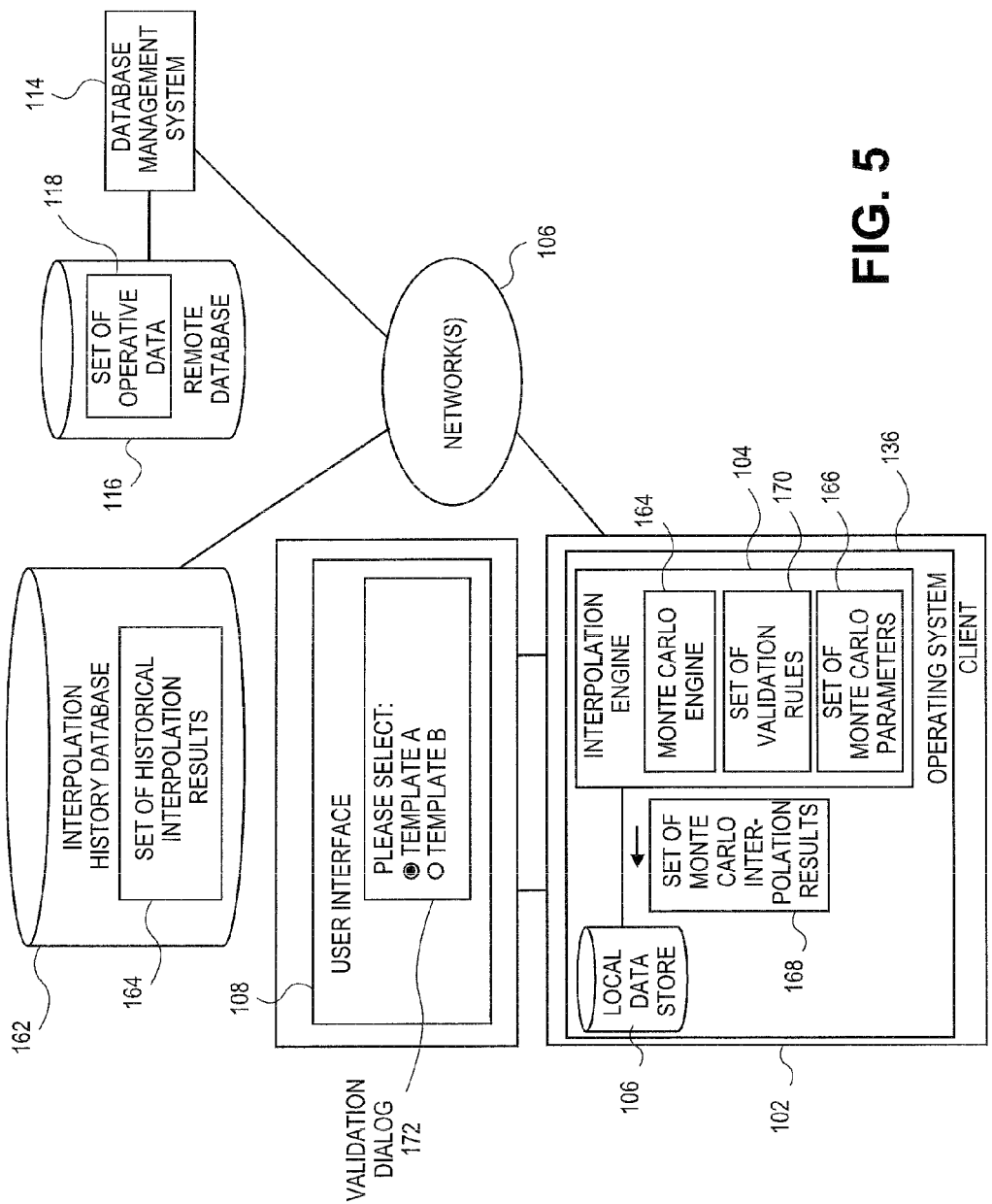
FIG. 5 illustrates an exemplary network configuration that can be used in conjunction with systems and methods for validating interpolation results using Monte Carlo simulations on interpolated data inputs, according to various embodiments of the present teachings.

More particularly, and as for shown in FIG. 5, in embodiments, the interpolation engine 104 of client 102 and/or associated logic or services can be configured to perform variational analytics such as Monte Carlo simulations, routines, and/or processes on the set of interpolated input data 126 and/or other data that have been produced in prior interpolation studies or results. In aspects as shown, in embodiments the client 102 can host or execute a Monte Carlo engine 164, such as an application and/or other software configured to perform Monte Carlo type randomization and/or other statistical processing, such as to perform random "walk" or perturbation analysis on selected variables and/or other data sets in the set of combined input data 122 and/or other data sets or variables, including the set of interpolated input data 126. In aspects, a administrator, owner, operator, and/or other user can wish to perform a Monte Carlo and/or other perturbation or randomization process, routine, and/or analysis on that data to validate, test, verify, confirm, and/or otherwise analyze or perform a trial on the data to ensure its accuracy or validity as a set of interpolation outputs or results. According to aspects, that type of analysis can assist for instance in detecting or identifying interpolated variables which exhibit erratic behavior under randomized changes to other inputs, which may indicate that those variables, the interpolation function 140 that produced those variables, and/or other factors or computations involved in producing the set of interpolated input data 126 and/or other data may contain an error, fault, or inaccuracy.

In aspects as shown, the Monte Carlo engine 164 can access and/or maintain a set of validation rules 170 reflecting limits, functions, tests, thresholds, and/or other criteria for determining or accepting that variables in the set of interpolated input data 126 and/or other data is valid or verified. The set of validation rules 170 can encode rules or criteria that, for example, a marginal change in one interpolated input in the set of interpolated input data 126 must exhibit a linear response that that alteration, indicating that the response of the co-variable is comparatively "forgiving" or well-behaved under changes to other inputs. The set of Monte Carlo parameters 166 can encode other rules, filters, or criteria, such as to state that the interpolated variables in a data set may not change by more than twice the amount of a selected other input variable that is being subjected to a Monte Carlo analysis, and/or other limits, thresholds, or criteria. In aspects, the Monte Carlo process or routine can be performed using a validation dialog 172 that can be accessed by a administrator, owner, operator, and/or other user, in which the user can for instance select or input a set of Monte Carlo parameters 166 to initiate and conduct that analysis on one or more of the variables contained in the set of interpolated input data 126. The set of Monte Carlo parameters 166 can for instance indicate a number of times that a random perturbation or alteration be performed within one analytic run, such as 100, 500, 1000, 2000, and/or other numbers of times. The set of Monte Carlo parameters 166 can like encode or indicate other details regarding the execution of the Monte Carlo routine or analysis on one or more variables in the set of interpolated input data 126 and/or other parameters, such as to indicate the maximum deviation or perturbation to be performed. Other settings can be used.

In aspects, and as generally shown, the administrator, owner, operator, and/or other user can use the validation dialog 172 to select and/or configure the set of Monte Carlo parameters 166, the set of validation rules 170, and/or other settings or data to be used in the performance of the Monte Carlo validation process or routine. In general, the Monte Carlo engine 164 can be invoked or configured to apply the configured Monte Carlo process to one or more set of interpolated input data 126, and/or other data, using the set of Monte Carlo parameters 166. In aspects, each variable, run, and/or other result or output produced by the Monte Carlo processing can be subjected to the set of validation rules 170, to select or accept those interpolated values which have been determined to be within expected range, response, and/or otherwise valid. Those variables which do not satisfy the set of validation rules 170 can be excluded, separated, and/or deleted from the processing results. In aspects, the validated results can be aggregated into a set of Monte Carlo interpolation results 168, reflecting the values of variables in the set of interpolated input data 126 and/or other data which have been tested and validated by the Monte Carlo, and/or other perturbation analysis. The set of Monte Carlo interpolation results 168 can then be stored as a separate set of data, and/or can replace the original set of interpolated input data 126 and/or other data for future use. Other storage or encoding schemes can be used.

Figure 6:
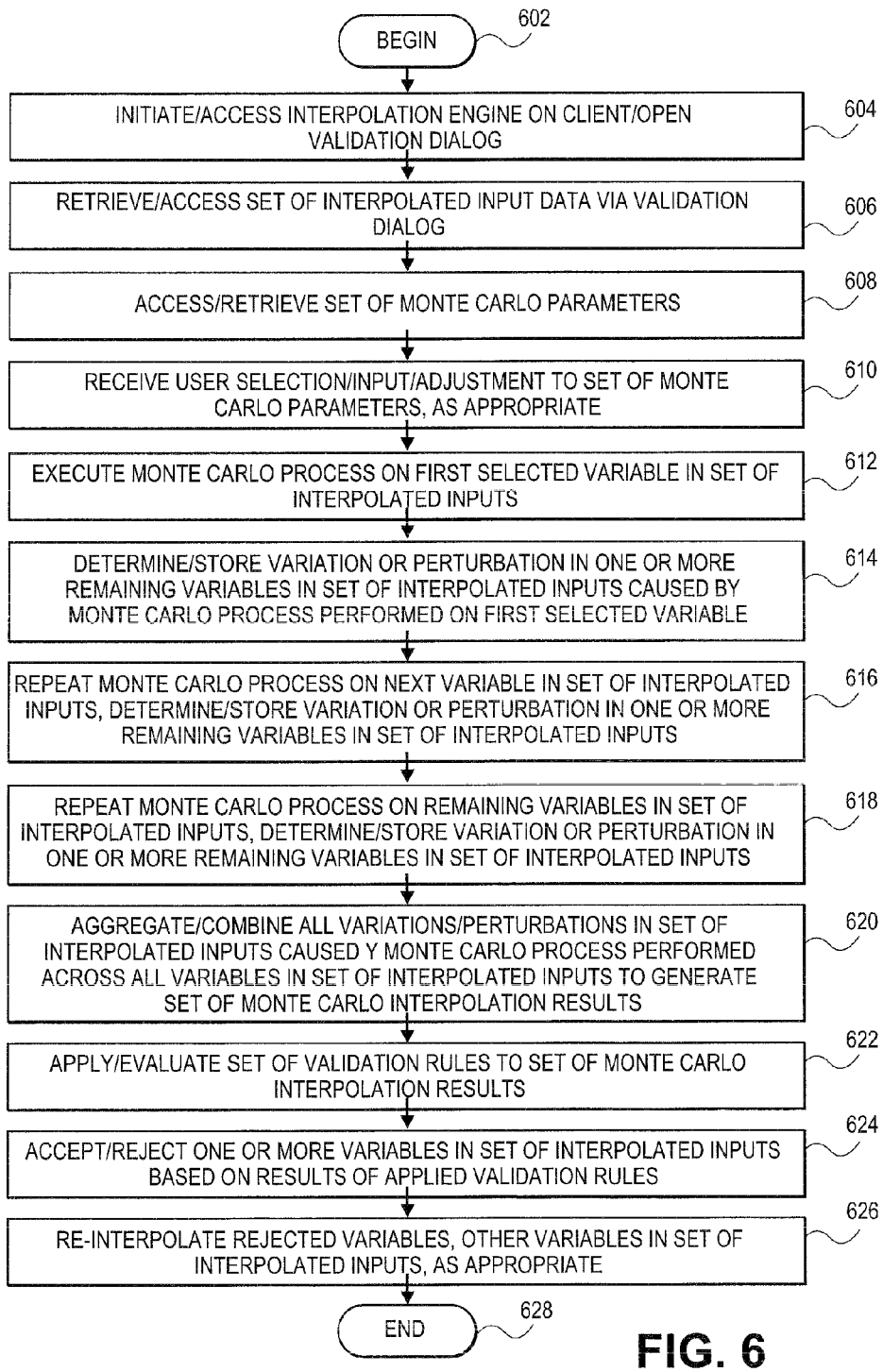
FIG. 6 illustrates a flowchart of exemplary training and other processing that can be used in connection with systems and methods for validating interpolation results using Monte Carlo simulations on interpolated data inputs, according to various embodiments.

FIG. 6 illustrates an illustration of process flow that can be used in systems and methods for validating interpolation results using Monte Carlo simulations on interpolated data inputs, according to various embodiments. In 602, processing can begin. In 604, an analyst, operator, and/or other user can initiate and/or access the interpolation engine 104 on the client 102 and/or other platform, and open, initiate, and/or access the validation dialog 172 via the interpolation engine 104 and/or other logic, application, service, and/or interface. In 606, the administrator, owner, operator, and/or other user can retrieve and/or access the set of interpolated input data 126 and/or other data using the validation dialog 172 and/or other interface, for instance by selecting that data from a list of presented files or directories. In 608, the administrator, owner, operator, and/or other user can access, input, select, and/or retrieve the set of Monte Carlo parameters 166 via the validation dialog 172 and/or other interface. The set of Monte Carlo parameters 166 can include data such as an initial randomization range or limit by which or within which individual variables will be subjected to a set of perturbations or marginal changes, such as, for example 5%, 10%, and/or other ranges or values. The set of Monte Carlo parameters 166 can likewise include data such as a number of times to repeat the execution of a randomization process on one or more variables or factors, such as, for instance, 500 times, 1000 times, 2000 times, and/or other numbers of iterations, for instance after which the average of those values will be used to determine the resulting effects or changes in other interpolated values or variables. The set of Monte Carlo parameters 166 can likewise include values for the maximum amount of deviation that can be shown in other interpolated values caused by the varying of one or more selected input values, and still consider those values to be valid. That amount of deviation can be expressed as, for instance, 5%, 10%, 15% and/or other percentages, levels, functions or values of the original value for each variable whose perturbation behavior is being considered. Other settings or values can be included in the set of Monte Carlo parameters 166.

In 610, the interpolation engine 104 and/or other logic can receive any user selection, input, adjustment, and/or other configuration input to set or modify the set of Monte Carlo parameters 166, as appropriate. In aspects, as noted the administrator, owner, operator, and/or other user can input or select any one or more of the set of Monte Carlo parameters 166, and/or in aspects, any one or more, or all, of those values can be automatically determined or accessed by the interpolation engine 104 and/or other logic, site, and/or service. In 612, the Monte Carlo engine 164, interpolation engine 104, and/or other logic, service, and/or site can execute a Monte Carlo process or routine on a first selected variable in the set of interpolated input data 126, and/or other data. In aspects, the first selected variable can be automatically selected or identified via the Monte Carlo engine 164, interpolation engine 104, and/or other logic, site, and/or service, such as by selecting the first variable in the set of interpolated input data 126 that has been generated in a previous interpolation run. In aspects, the Monte Carlo process or routine can be configured and/or initiated using the set of Monte Carlo parameters 166. Thus for instance, in a set of interpolated input data 126 related to a climate study, the Monte Carlo engine 164, interpolation engine 104, and/or other logic, site or service can determine that the first variable (e.g., V1) to be subjected to a Monte Carlo and/or other variational analysis or process in the variable for average ocean temperature for summer 2010, whose initially interpolated value in the set of interpolated input data 126 is 55.6 degrees F. The Monte Carlo engine 164, interpolation engine 104, and/or other logic, site or service can determine or read out from the set of Monte Carlo parameters 166 that the range of the randomized walk for the Monte Carlo routine shall be +/−8%, and that the random perturbation or alteration in the value of V1 shall be repeated or iterated 500 times, prepare and/or initiate that processing run.

In 614, the Monte Carlo engine 164, interpolation engine 104, and/or other logic, site or service can determine, compute, and/or store the variation or perturbation in one or more remaining variables in the set of interpolated input data 126 caused by performing the Monte Carlo and/or other variational or randomized process on the first selected variable (e.g., V1 in the noted example). In aspects, the Monte Carlo engine 164, interpolation engine 104, and/or other logic, site or service can for instance record the updated or changed values in the remainder of the set of interpolated input data 126 each time the value of the average 2010 summer ocean temperature (V1) is randomly adjusted by up to plus or minus 8%, and store 500 instances of that set of changed or dynamic values reflecting the effects of performing a randomized walk or variation in the first variable (V1). In aspects, some or all of the remaining variables in the set of interpolated input data 126 may respond to the change in the first variable (illustratively V1) with corresponding changes in their own values, while other variables in the set of interpolated input data 126 may be unaffected or unchanged in the face of alterations in the value of the first variable (V1). In 616, the Monte Carlo engine 164, interpolation engine 104, and/or other logic, site or service can repeat the Monte Carlo routine or process on the next variable in the set of interpolated input data 126, and determine and/or store the variation, change, and/or perturbation that may result in one or more of the remaining variables in the set of interpolated input data 126. In aspects, and merely for further example, the Monte Carlo engine 164, interpolation engine 104, and/or other logic, site or service can determine, select, and/or identify a second variable (V2) in the climate study context such as the average summer wind speed, having an originally interpolated value of 6.6 mph. The Monte Carlo engine 164, interpolation engine 104, and/or other logic, site or service can access the set of Monte Carlo parameters 166 and determine that the second variable (V2) shall be randomly adjusted by up to plus or minus 5% in conducting a Monte Carlo process or analysis, and proceed to generate random perturbations in the average wind speed variable (V2) within that range or zone. In aspects, according to the set of Monte Carlo parameters 166 or otherwise, that random perturbation cane be carried out one time or a number of times, such as 500 times or another number, and for each randomized perturbation to the subject variable (V2) the change in the remaining variables in the set of interpolated input data 126 can also be identified and stored, including to notate variables which may, again, remain unchanged in the face of variation in the second variable (V2).

In 618, the Monte Carlo engine 164, interpolation engine 104, and/or other logic, site or service can repeat the Monte Carlo and/or other variational, randomized, and/or perturbation analysis on the remaining variables in the set of interpolated input data 126 (V3, V4, V5, . . . Vn), and determine, identify, calculate, and/or store the resulting variation and/or perturbation in the one or more other or remaining variables in the set of interpolated input data 126 for each run. In 620, the Monte Carlo engine 164, interpolation engine 104, and/or other logic, site or service can aggregate and/or combine all variations and/or perturbations in the set of interpolated input data 126 caused by the Monte Carlo and/or other process or routine performed across some or all variables in the set of interpolated input data 126, to generate a set of Monte Carlo interpolation results 168. In aspects, the set of Monte Carlo interpolation results 168 can include the results from all randomized or perturbation runs across all variables, and/or can include averages, summaries, and/or merged values for those results, as well as intermediate results or values and/or attributes associated with the randomized and/or marginal alterations of interpolation data, and/or additional data. In aspects, the set of Monte Carlo interpolation results 168 can be stored as or in a database, in a matrix, and/or encoded in other formats.

In 622, the Monte Carlo engine 164, interpolation engine 104, and/or other logic, site or service can apply the set of validation rules 170 to the set of Monte Carlo interpolation results 168, to evaluate and/or condition the data contained in the set of Monte Carlo interpolation results 168 including individual interpolated variables. In aspects, the set of validation rules 170 can indicate or encode rules to be used to evaluate the validity of the original values of each interpolated input value, before the Monte Carlo process was used to probe or test that value. Thus for example, one rule in the set of validation rules 170 can indicate that the original value of a variable demonstrating a change in value that is more than twice the percentage change in the perturbed value of the variable being randomly altered (e.g., V1, V2, V3 or others in turn) shall be rejected or invalidated, since that variable is displaying a possibly anomalous, disproportionate, and/or otherwise unreliable response to changes over other input values. That is, in aspects, variables which are well behaved and/or which generally conform to expected values under randomized walks in the values of other interpolated variables can be assumed to have been generated according to a valid interpolation function and/or otherwise represent valid inferred values. In aspects, for instance, those variables which display a linear response to changes in the selected randomized variable, such as changing by 5% or 7.5% to changes of 5% in that variable, or other linear responses, can be assumed to be valid. In aspects, those variables which display a non-linear response to changes in the selected randomized variable, such as changing by 150% to changes of 5% in that variable, and/or 350% to changes of 8% to that same variable, or other non-linear responses, can be assumed to be invalid or unreliable. Other tests, filters, and/or criteria for identifying valid or invalid values and/or variables in the set of interpolated input data 126 can be used and encoded in the set of Monte Carlo parameters 166, and/or other rules or heuristics.

In 624, the administrator, owner, operator, and/or other user and/or Monte Carlo engine 164, interpolation engine 104, and/or other logic or service can accept or reject one or more variables in the set of Monte Carlo interpolation results 168 based on the results of the applied set of validation rules 170 and/or other criteria. In 626, the administrator, owner, operator, and/or other user and/or Monte Carlo engine 164, interpolation engine 104, and/or other logic or service can initiate a re-interpolation of any rejected variables in the set of Monte Carlo interpolation results 168, and/or of other interpolated input data or variables, as appropriate. For instance, if the administrator, owner, operator, and/or other user suspects that one or more of the set of Monte Carlo interpolation results 168 failed to produce acceptable or valid values as measured of validated by the set of Monte Carlo parameters 166 due to faulty or invalid initial conditions during the interpolation of that variable or value, the user and/or other logic can choose to zero out the value of that variable, and begin interpolation or re-interpolation activities to determine whether that value can be made to appear valid or conform to the set of Monte Carlo parameters 166 when those interpolation conditions are updated. In 628, the administrator, owner, operator, and/or other user and/or administrator, owner, operator, and/or other user and/or Monte Carlo engine 164, interpolation engine 104, and/or other logic or service can store the interpolation results which have been updated, verified and/or validated by Monte Carlo processing as a further or new set of interpolated input data 128, which can replace the original data or can be stored as an updated object or version, separately. In 630, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the interpolation engine 104 comprises a single application or set of hosted logic in one client 102, in embodiments the interpolation and associated logic can be distributed among multiple local or remote clients or systems. In embodiments, multiple interpolation engines can be used. Similarly, while embodiments have been described in which the set of operative data 118 is accessed via one remote database management system 114 and/or a remote database 116 associated with the remote database management system 114, in embodiments, the set of operative data 118 and associated information can be stored in one or multiple other data stores or resources, including in local data store 138 of client 102. Still further, while embodiments have been described in which a unitary weighting tool 154 is hosted in the interpolation engine 104 itself, in embodiments, the weighting tool 154 can be hosted or installed in a different local or remote host machine, logic, and/or service. In embodiments, the weighting tool 154 can comprise a plurality of tools or logic distributed in or over one or more machines, platforms, or services. Other resources described as singular or integrated can in embodiments be plural or distributed, and resources described as multiple or distributed can in embodiments be combined. The scope of the invention is accordingly intended to be limited only by the following claims.

What is claimed is:

1. A method, comprising:
    accessing, by an interpolation engine running on a computing device, a set of combined input data comprising a set of predetermined input data and a set of interpolated input data, the set of interpolated input data being generated to conformally map the set of combined input data to a set of target output data and comprising a set of variables;
    performing, by the interpolation engine, a variational analysis on at least a first variable in the set of variables, wherein the variational analysis comprises applying a perturbation to the at least first variable;
    determining a change in at least one remaining variable in the set of variables caused by the variational analysis performed on the at least first variable; and
    applying a set of validation rules to the change in the at least one remaining variable to validate or reject a value of the at least first variable.

2. The method of claim 1, wherein the variational analysis comprises a Monte Carlo simulation performed on the at least first variable.

3. The method of claim 2, wherein the perturbation is a random perturbation, and wherein the Monte Carlo simulation comprises applying the random perturbation to the at least first variable.

4. The method of claim 3, wherein the random perturbation comprises an increase or decrease in the at least first variable based on a randomization range.

5. The method of claim 4, wherein the set of validation rules comprises a limit to the change in the at least one of the remaining variables.

6. The method of claim 5, wherein the limit to the change in the at least one of the remaining variables comprises a function of the randomization range.

7. The method of claim 1, further comprising repeating the variational analysis on the remainder of the variables in the set of interpolated input data.

8. The method of claim 7, further comprising repeating the determining a change in at least one of the remaining variables in the set of variables in the set of interpolated input data caused by variational analysis performed on the remainder of the variables in the set of interpolated input data.

9. The method of claim 8, further comprising storing changed variables caused by the variational analysis across all variables in the set of interpolated input data to generate a set of Monte Carlo interpolation results.

10. The method of claim 1, wherein the set of predetermined input data comprises at least one of a set of financial data, a set of medical data, a set of demographic data, a set of engineering data, a set of network operations data, or a set of geographic data.

11. A system, comprising:
    an interface to a database storing a set of target output data and a set of combined input data, the set of combined input data comprising—
    a set of predetermined input data, and
    a set of interpolated input data, the set of interpolated input data being generated to conformally map the set of combined input data to the set of target output data and comprising a set of variables; and
    a processor, communicating with the database via the interface, the processor being configured to—
    access the set of combined input data,
    perform a variational analysis on at least a first variable in the set of variables, wherein the variational analysis comprises applying a perturbation to the at least first variable,
    determine a change in at least one remaining variable in the set of variables caused by the variational analysis performed on the at least first variable, and
    apply a set of validation rules to the change in the at least one remaining variable to validate or reject the value of the at least first variable.

12. The system of claim 11, wherein the variational analysis comprises a Monte Carlo simulation performed on the at least first variable.

13. The system of claim 12, wherein the perturbation is a random perturbation, and wherein the Monte Carlo simulation comprises applying the random perturbation to the at least first variable.

14. The system of claim 13, wherein the random perturbation comprises an increase or decrease in the at least first variable based on a randomization range.

15. The system of claim 14, wherein the set of validation rules comprises a limit to the change in the at least one of the remaining variables.

16. The system of claim 15, wherein the limit to the change in the at least one of the remaining variable comprises a function of the randomization range.

17. The system of claim 11, wherein the processor is further configured to repeat the variational analysis on the remainder of the variables in the set of interpolated input data.

18. The system of claim 17, wherein the processor is further configured to repeat the determining a change in at least one of the remaining variables in the set of variables in the set of interpolated input data caused by the variational analysis performed on the remainder of the variables in the set of interpolated input data.

19. The system of claim 18, wherein the processor is further configured to store changed variables caused by the variational analysis across all variables in the set of interpolated input data to generate a set of Monte Carlo interpolation results.

20. The system of claim 11, wherein the set of predetermined input data comprises at least one of a set of financial data, a set of medical data, a set of demographic data, a set of engineering data, a set of network operations data, or a set of geographic data.

21. A non-transitory computer readable medium having instructions that, when executed by a computing device, cause the computing device to perform a method comprising:
    accessing, by an interpolation engine running on the computing device, a set of combined input data comprising a set of predetermined input data and a set of interpolated input data, the set of interpolated input data being generated to conformally map the set of combined input data to a set of target output data and comprising a set of variables;
    performing, by the interpolation engine, a variational analysis on at least a first variable in the set of variables, wherein the variational analysis comprises applying a perturbation to the at least first variable;
    determining a change in at least one remaining variable in the set of variables caused by the variational analysis performed on the at least first variable; and
    applying a set of validation rules to the change in the at least one remaining variable to validate or reject a value of the at least first variable.

22. The non-transitory computer readable medium of claim 21, wherein the perturbation is a random perturbation, and wherein the variational analysis comprises a Monte Carlo simulation performed on the at least first variable using the random perturbation of the at least first variable.

* * * * *